United States Patent [19]

Harvey

[11] Patent Number: 4,864,332
[45] Date of Patent: Sep. 5, 1989

[54] CAMERA APPARATUS FOR MAGNETICALLY ENCODING A FILM LEADER

[75] Inventor: Donald M. Harvey, Webster, N.Y.

[73] Assignee: Eastman Kodak Company, Rochester, N.Y.

[21] Appl. No.: 242,658

[22] Filed: Sep. 12, 1988

[51] Int. Cl.⁴ .......................... G03B 1/12; G03B 1/60; G03B 17/24
[52] U.S. Cl. ....................................... 354/21; 354/105; 354/173.1; 354/218
[58] Field of Search ...................... 354/21, 105, 173.1, 354/173.11, 218

[56] References Cited

U.S. PATENT DOCUMENTS

| | | | |
|---|---|---|---|
| 2,674,009 | 4/1954 | Williams | 18/59 |
| 4,120,572 | 10/1978 | Grallert et al. | 352/92 |
| 4,198,136 | 4/1980 | Staudaeher et al. | 352/16.9 |
| 4,215,920 | 8/1980 | Butler | 352/92 |
| 4,340,286 | 7/1982 | Carr | 354/105 |
| 4,385,814 | 5/1983 | Elliott | 352/92 |
| 4,420,236 | 12/1983 | Taniguchi et al. | 354/21 |
| 4,423,943 | 1/1984 | Gold | 354/275 |
| 4,443,077 | 4/1984 | Tanikawa | 354/21 |
| 4,500,183 | 2/1985 | Tanikawa | 354/21 |
| 4,588,272 | 5/1986 | Hoda et al. | 354/21 |

Primary Examiner—Michael L. Gellner
Attorney, Agent, or Firm—Roger A. Fields

[57] ABSTRACT

When a filmstrip is completely exposed in a camera, double-exposure prevention (DEP) data is magnetically applied to the film leader substantially immediately before the leader is rewound with the filmstrip into a light-tight cassette. The DEP data indicates there are no unexposed imaging areas remaining on the filmstrip. If the filmstrip is rewound into the cassette prematurely, i.e. without it being completely exposed, midroll interrupt (MRI) data is magnetically applied to the film leader instead of the DEP data to indicate the next-available unexposed imaaging area of the filmstrip. When the cassette is re-loaded into the camera, the film leader is advanced from the cassette initially to determine whether it is encoded with DEP or MRI data. If the DEP data is detected, the leader is rewound into the cassette since all of the imaging areas of the filmstrip are exposed. If the MRI data is detected, the filmstrip is advanced from the cassette to locate the next-available unexposed imaging area in an exposure position. Warning means, responsive to the sensing of the DEP data or the MRI data, provides a visible and/or audible signal that a completely used or partially used film roll has been loaded in the camera.

12 Claims, 11 Drawing Sheets

LOAD/DOUBLE EXPOSURE PREVENTION (DEP) ROUTINE

CAMERA APPARATUS FOR MAGNETICALLY ENCODING A FILM LEADER

CROSS-REFERENCE TO A RELATED APPLICATION

Reference is made to commonly assigned copending application Serial No. 221,955, entitled MOTOR-DRIVEN FILM TRANSPORT APPARATUS, and filed July 20, 1988 in the name of Donald M. Harvey.

The cross-referenced application is incorporated into this application by the foregoing reference.

BACKGROUND OF THE INVENTION

Field of the Invention

The invention relates generally to photography, and particularly to camera apparatus for magnetically encoding a film leader.

Description of the Prior Art

Generally speaking, commercially available 35 mm film cassettes such as manufactured by Eastman Kodak Co. and Fuji Photo Co., Ltd. comprise a hollow cylindrical shell having an integral throat or lipped portion which extends tangentially from the shell. A film spool on which the filmstrip is wound is freely rotatable within the cassette shell. The filmstrip has a leading section, commonly referred to as a "film leader", which protrudes from a light-trapped slit in the throat portion to the outside of the cassette shell. Typically, the protruding leader extends 2-3 inches in length.

In conventional 35 mm film cassettes, one end of the film spool on which the filmstrip is wound has a short axial extension which projects from the cassette shell, enabling the spool to be turned by hand. If the spool is manually rotated initially in an unwinding direction, the film convolutions inside the cassette shell will tend to expand radially since the inner end of the filmstrip is attached to the spool, and the film leader protruding from the slit will remain stationary. The film convolutions can expand radially until a non-slipping relation is established between the outermost convolution and the inner curved wall of the cassette shell. Once this non-slipping relation exists, there is a binding effect between the outermost convolution and the shell which prevents further rotation of the spool in the unwinding direction. Consequently, rotation of the spool in the unwinding direction cannot serve to advance the filmstrip out of the shell, and it is necessary in the typical 35 mm camera to engage the protruding leader to pull the filmstrip out of the shell. If the spool is manually rotated initially in a winding direction, it will draw the protruding leader into the shell. Thus, the film leader will not be able to be engaged to pull the filmstrip out of the shell.

A 35 mm film cassette has been proposed which, unlike conventional film cassettes, includes a film leader that does not extend outside the cassette shell. The film leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During unwinding rotation of the film spool, the leading end of the filmstrip is advanced to and through a film passageway opening in order to exit the cassette shell. Thus, all that is needed to advance the film leader to the outside of the cassette shell is to rotate the film spool in an unwinding direction.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader can be manually grasped and attached to a film advancing device in the camera.

The Cross/Referenced Application

Like the type of film cassette disclosed in U.S. Pat. No. 4,423,923, the cross-referenced application discloses a film cassette that contains a non-protruding film leader which is advanced automatically to the outside of the cassette shell in response to rotation of the film spool in a unwinding direction. In addition, the film leader is returned to the inside of the cassette shell in response to rotation of the film spool in a winding direction. However, unlike the patent, the cross-referenced application discloses a motor-driven film transport apparatus (rather than manual means) for rotating the film spool to propel the non-protruding leader out of the cassette shell.

SUMMARY OF THE INVENTION

The invention goes beyond the prior art and the cross-referenced application relating to the type of film cassette that contains a non-protruding film leader by providing camera apparatus for magnetically encoding the film leader, when it is located outside the cassette shell, with various information that controls subsequent film movement.

Specifically, when a filmstrip is completely exposed in a camera, double-exposure prevention (DEP) data is magnetically applied to the film leader substantially immediately before the leader is rewound with the filmstrip into the film cassette. The DEP data indicates there are no unexposed imaging areas remaining on the filmstrip. If the filmstrip is rewound into the cassette prematurely, i.e. without it being completely exposed, midroll interrupt (MRI) data is magnetically applied to the film leader instead of the DEP data to indicate the next-available unexposed imaging area of the filmstrip. When the cassette is re-loaded into the camera, the film leader is advanced from the cassette initially to determine whether it is encoded with DEP or MRI data. If the DEP data is detected, the leader is rewound into the cassette since all of the imaging areas of the filmstrip are exposed. If the MRI data is detected, the filmstrip is advanced from the cassette to locate the next-available unexposed imaging area in an exposure position. Warning means, responsive to the sensing of the DEP data or the MRI data, provides a visible and/or audible signal that a completely used or partially used film roll has been loaded in the camera.

DETAILED DESCRIPTION OF THE PREFERRED EMBODIMENT

The invention is disclosed as being embodied preferably in a 35mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
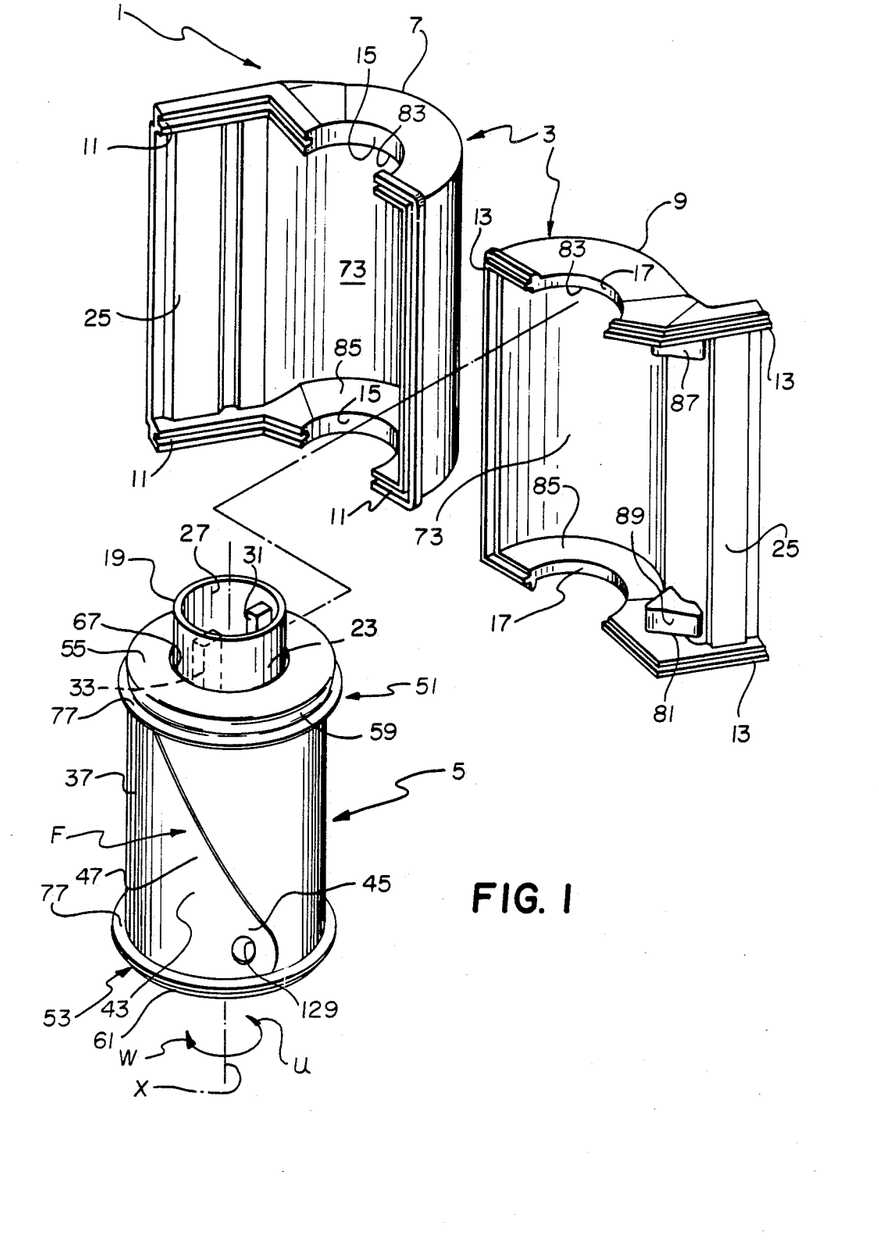
FIG. 1 is an exploded perspective view of a film cassette having a non-protruding film leader as disclosed in the cross-referenced application.
Figure 2:
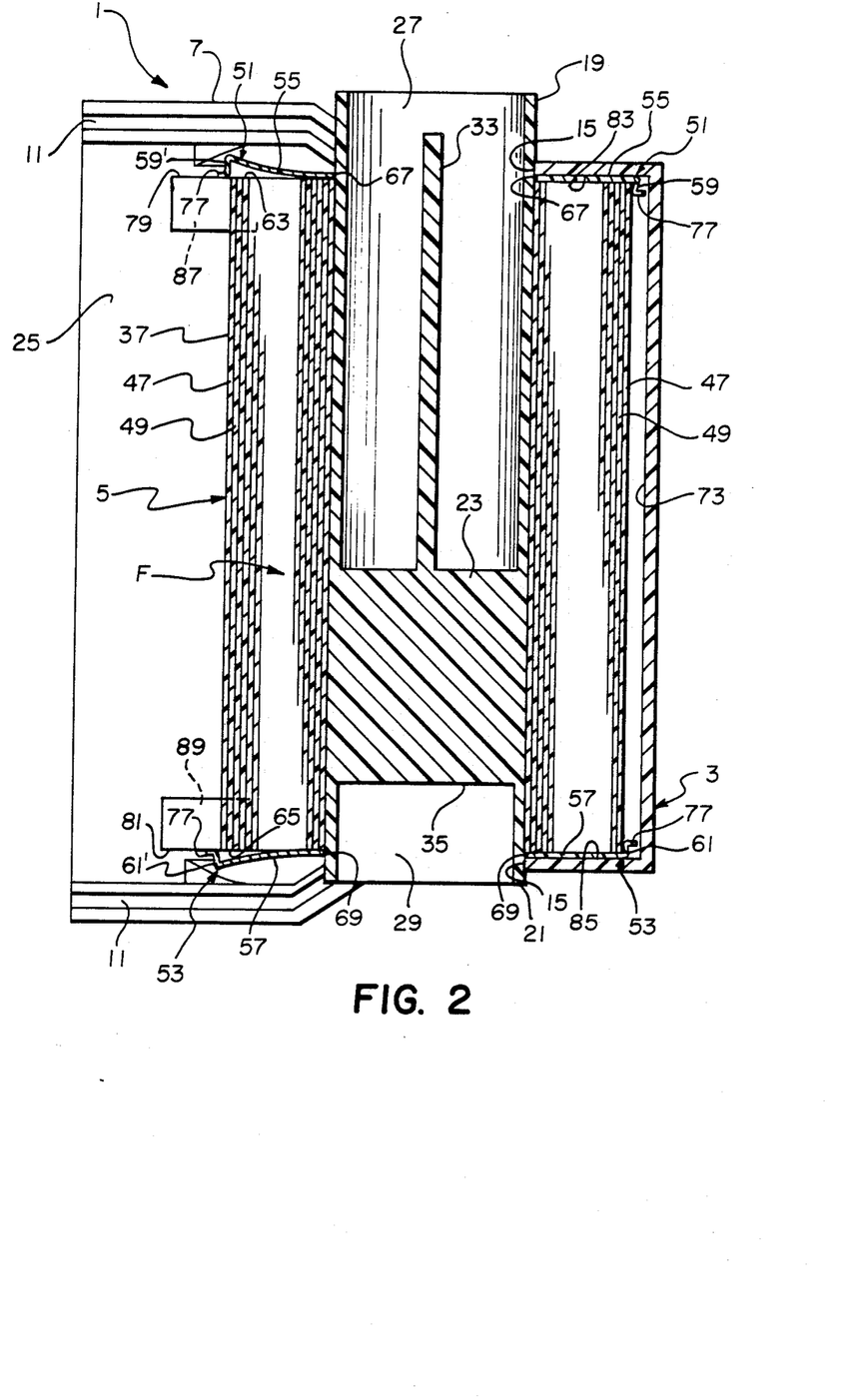
FIG. 2 is an elevation view in cross-section of the film cassette.
Figure 3:
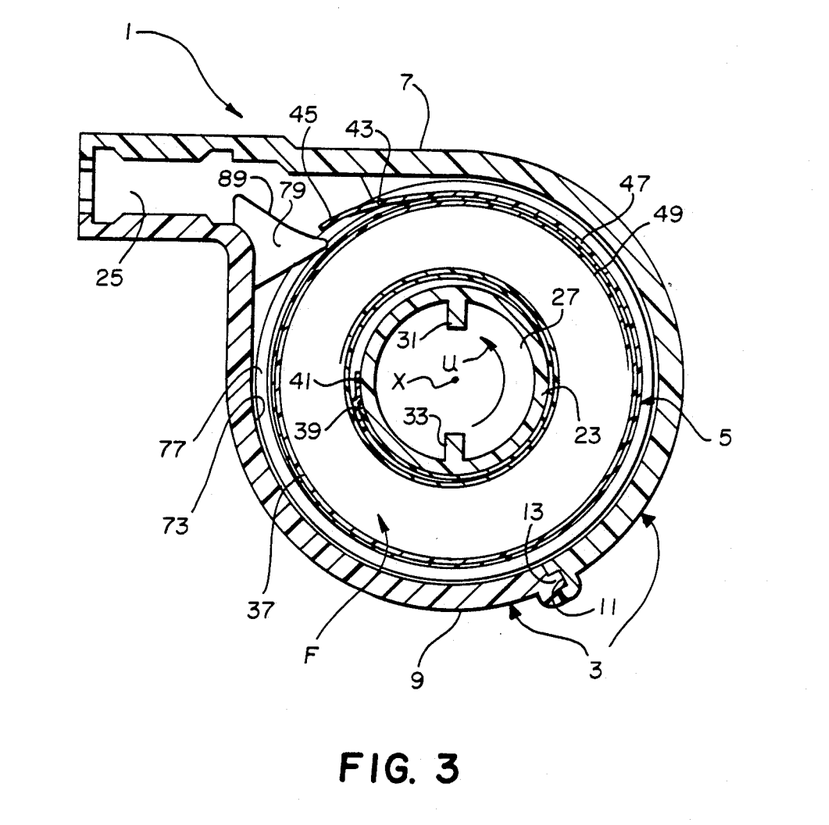
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halved 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction indicated by the arrow W in the same FIG.

A roll 37 of convoluted 35 mm film F having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has leading or forward end 45 and comprises 2-3 convolutions of the film roll 37. One of these leader convolutions is the outermost convolution 47 and another of them is the next inward succeeding convolution 49.

Figure 4:
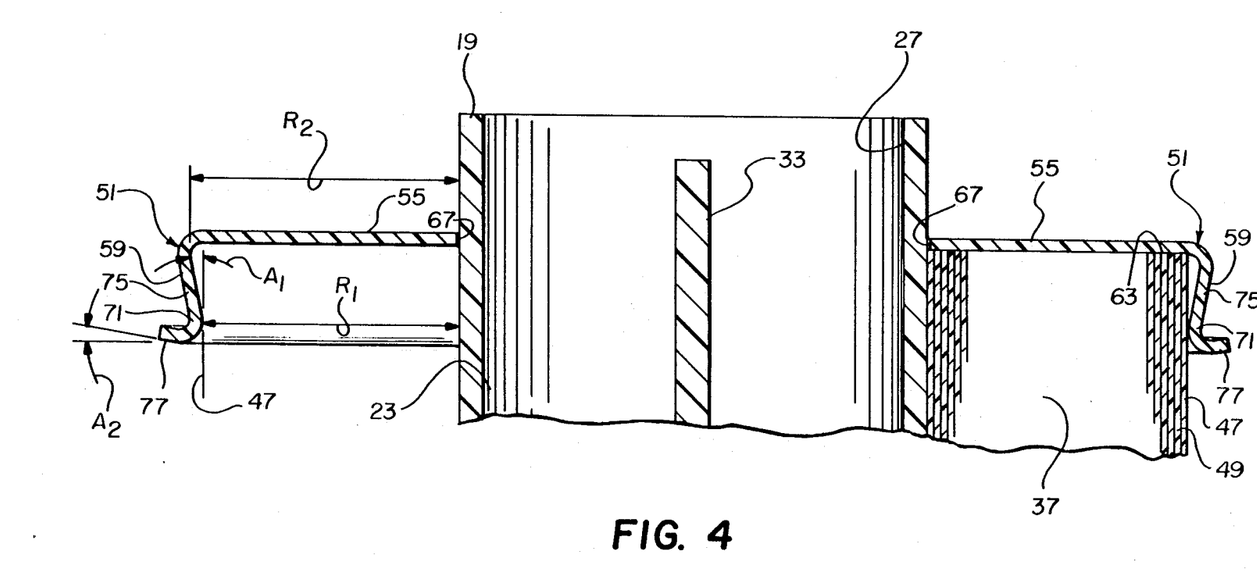
FIG. 4 is an elevation view in cross-section of a film spool and an annular constraining flange depicted inside the cassette shell shown in FIGS. 1 and 2.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 and the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction W, the filmstrip F will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

The Camera Apparatus

Figure 5:
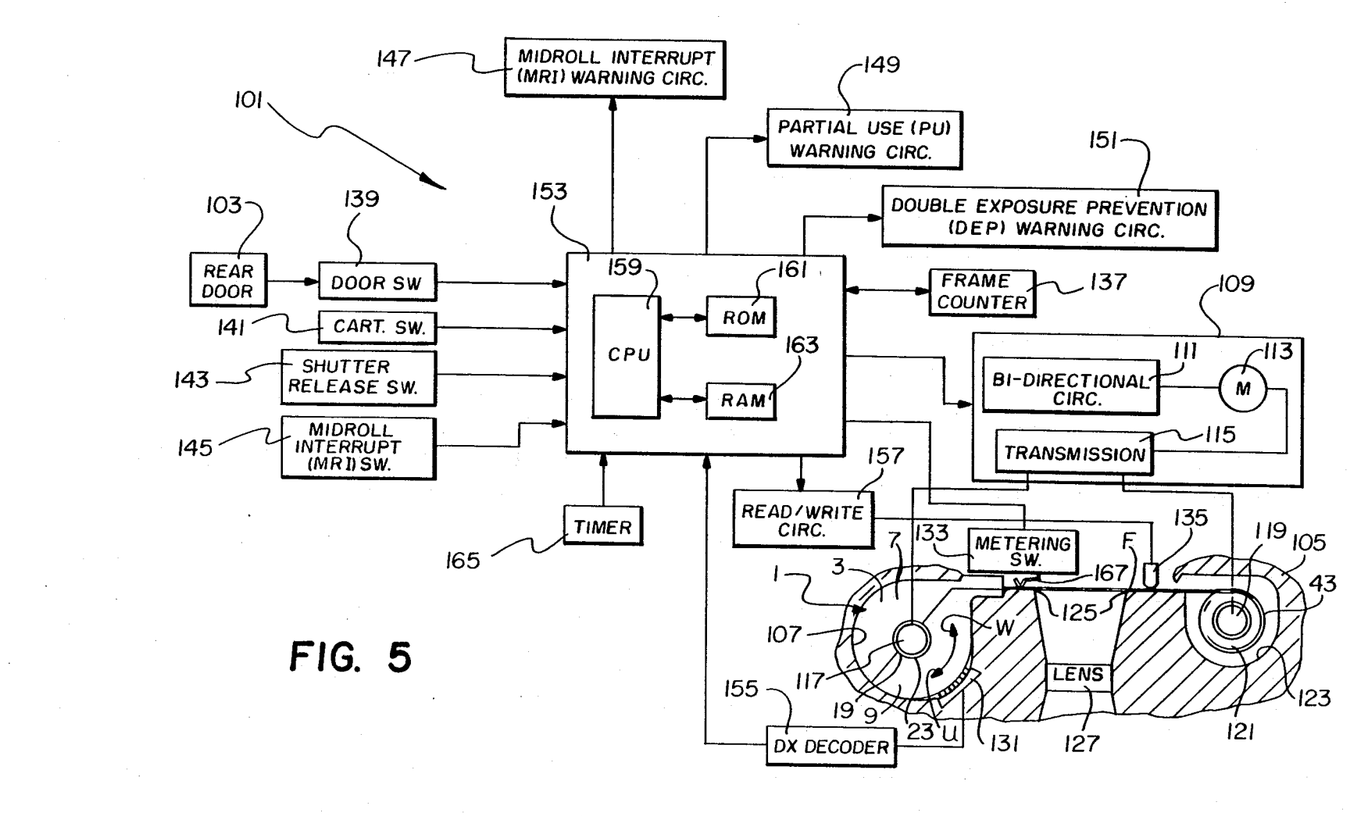
FIG. 5 is a schematic view of camera apparatus for magnetically encoding the film leader and for controlling film movement, according to a preferred embodiment of the invention.

Referring now to FIG. 5, camera apparatus 101 is depicted for use with the type of film cassette 1 having a normally non-protruding film leader 43. Briefly, the camera apparatus 101 is intended to magnetically apply alterable data to the film leader 43, only when the leader is located outside the cassette shell 3.

As shown in FIG. 5, the camera apparatus 101 includes a conventional rear or bottom door 103 pivotally mounted on the camera body 105 for opening to permit insertion of the film cassette 1 laterally or axially (endwise) into a loading chamber 107. Motorized film transport means 109 comprising a conventional bi-directional circuit 111 for reversing a drive motor 113, a suitable drive transmission 115 similar to the one disclosed in the Harvey patent application cross-referenced above, and respective drive hubs 117 and 119 which engage the spool core 23 of the film cassette 1 and a take-up spool or drum 121 rotatably supported within a take-up chamber 123, is provided for rotating the spool core and the take-up drum either in the unwinding direction U or in the winding direction W. When fresh unused (unexposed) film is loaded in the camera apparatus 101, the film transport means 109 is operated initially to rotate the spool core 23 in the unwinding direction U to propel the non-protruding film leader 43 out of the cassette shell 3, across a back frame opening 125 situated at the focal plane of a taking lens 127, and onto the take-up drum 121. At the same time, the drum 121 is rotated in the unwinding direction U to permit a tooth, not shown, located on its periphery, to engage the film leader 43 at a hole 129 cut in the leading end 45 of the leader. See FIG. 6. Then, a predetermined length of the filmstrip F slightly greater than three frame widths X is wound onto the take-up drum 121 to locate a first-available film frame #1 in FIG. 6, i.e. a first-available imaging area of the filmstrip F, in a proper exposure position at the back frame opening 125. After the first picture is taken, the film transport means 109 is operated to wind the first exposed frame onto the take-up drum 121 and to advance the next-available unexposed frame #2 in FIG. 6 into the exposure position. When the filmstrip F is completely exposed, that is there are no remaining unexposed frames, the motor 113 is reversed to rotate the spool core 23 in the winding direction W, and the drive hub 119 is uncoupled from the motor. This is done to rewind the filmstrip F, including the film leader 43, back into the cassette shell 3.

Other elements of the camera apparatus 101 include a conventional array of DX sensors 131, a conventional metering switch 133, a conventional magnetic read/write head 135, a conventional digital film frame counter 137, a normally open door switch 139, a normally open cartridge switch 141, a normally open shutter release switch 143, a normally open midroll interrupt (MRI) switch 145, and respective conventional midroll interrupt (MRI), partial film use (PU), and double exposure prevention (DEP) warning circuits 147, 149, and 151. Each of the elements 131, 133, 135, 137, 139, 141, 143, 145, 147, 149, and 151, as well as the film transport means 109, is connected individually to a conventional digital microcomputer 153 such as used in many recent cameras. As shown in FIG. 5, the DX sensors 131 are connected to the microcomputer 153 via a conventional DX decoder 155, and the read/write head 135 is connected to the microcomputer via a conventional read/write circuit 157. The microcomputer 153 as is customary includes a central processing unit (CPU) 159, a random access memory (RAM) 161, a read-only memory (ROM) 163, and a timer 165.

Figure 6:
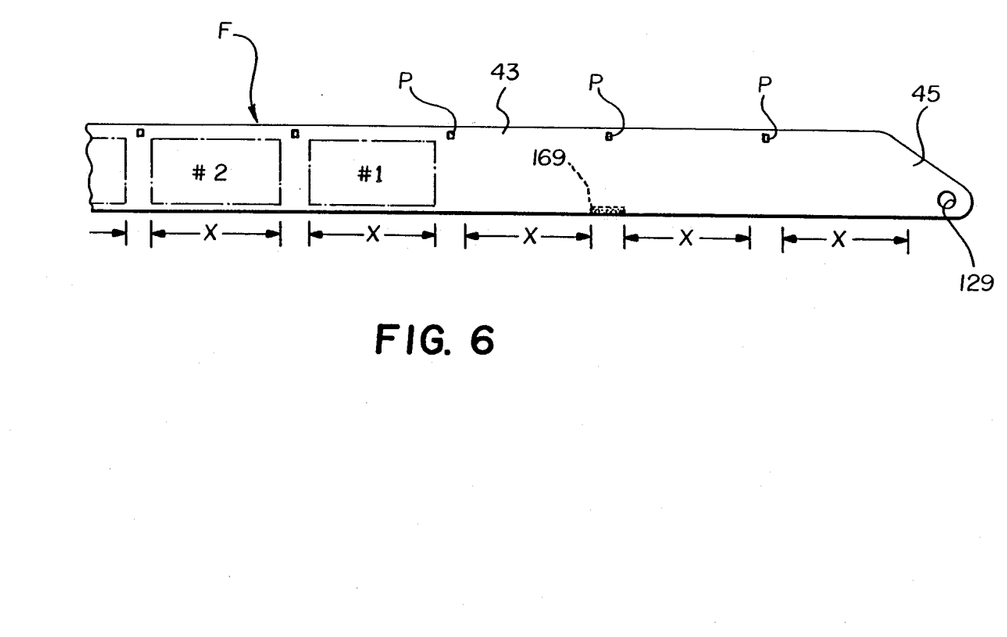
FIG. 6 is a plan view of the film leader.

The DX sensors 131 are positioned in the loading chamber 107 to read a known DX encodement on the outside of the cassette shell 3 which indicates the maximum number (M) of exposures that can be taken, i.e. the total number of available film frames, using the filmstrip F. Typically, the maximum number M is 20, 24, or 36. The metering switch 133 is closed each time a perforation sensor 167 of the switch drops into one of a series of evenly spaced film perforations P in the filmstrip F. As shown in FIG. 6, the filmstrip F has a single perforation P between each two adjacent frames widths X. When the metering switch 133 is closed, it indicates that the filmstrip F has been moved slightly more than a single frame width X, and a pulse is generated in the microcomputer 153 which may be counted by a conventional up/down counter, not shown, or by the frame counter 137. The frame counter 137 as is customary has thirty-six numbered settings or frame number indications represented by the numbers "1, 2, . . . 36" which correspond to the respective available film frames #1, #2, etc., in FIG. 6. That is, each numbered setting of the frame counter 137 indicates the next-available unexposed film frame. An original or initial setting of the frame counter 137 is represented by the letter "S". This setting usually indicates that the loading chamber 107 is empty, and it is separated from the first available frame setting "1" by three discrete settings each represented by a dot ".". When the film leader 43 is propelled from the film cassette 1 and onto the take-up drum 121, and the first-available frame #1 in FIG. 6 is located in the exposure position, the metering switch 133 will have closed four times, due to its perforation sensor 167 successively dropping into four perforations P, since the filmstrip F will have advanced slightly more than four frame widths X. Thus, the frame counter 137 will be incremented from its "S" setting, successively to its three dot"." settings, and then to its first frame setting "1". Thereafter, each time the filmstrip F is advanced slightly more than one frame width X to locate a fresh film frame in the exposure position, the frame counter 137 will be incremented to its next numbered setting (until it reaches the maximum number M).

The read/write head 135 is intended to magnetically write certain data on the film leader 43 at a relatively small magnetic area 169 of the leader containing uniformly dispersed magnetic particles, and to magnetically read the same data. See FIG. 6. The door switch 139 is closed when the rear door 103 is closed and is opened when the rear door is opened. The cartridge switch 141 is closed whenever the film cassette 1 is present in the loading chamber 107 and is open whenever the chamber is empty. The shutter release switch 143 is closed each time a conventional shutter, not shown, is opened and is open whenever the shutter is closed. The midroll interrupt (MRI) switch 145 is closed when an MRI button, not shown, on the camera body 105 is manually depressed to initiate rewind of the filmstrip F into the film cassette 1 prematurely, i.e. before all of the available film frames have been exposed.

Figure 7A:
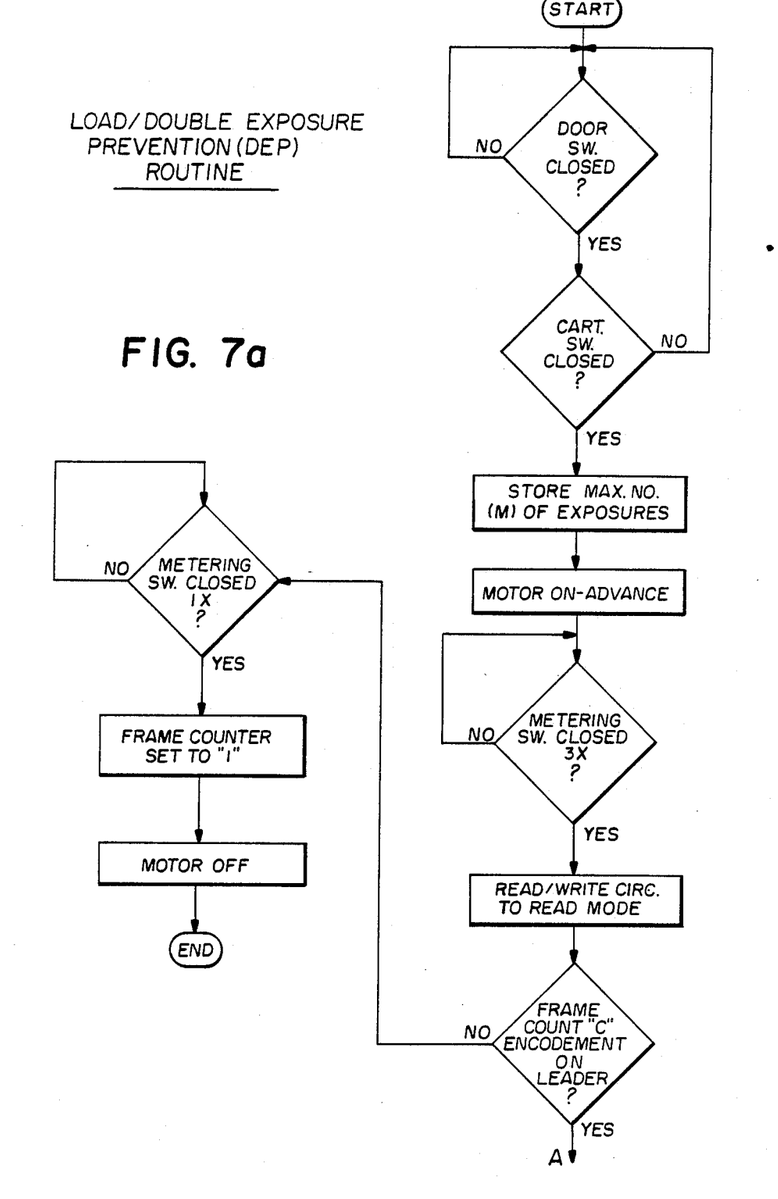
FIGS. 7a, 7b are a flow chart illustrating a load/double exposure prevention (DEP) routine of the camera apparatus.
Figure 7B:
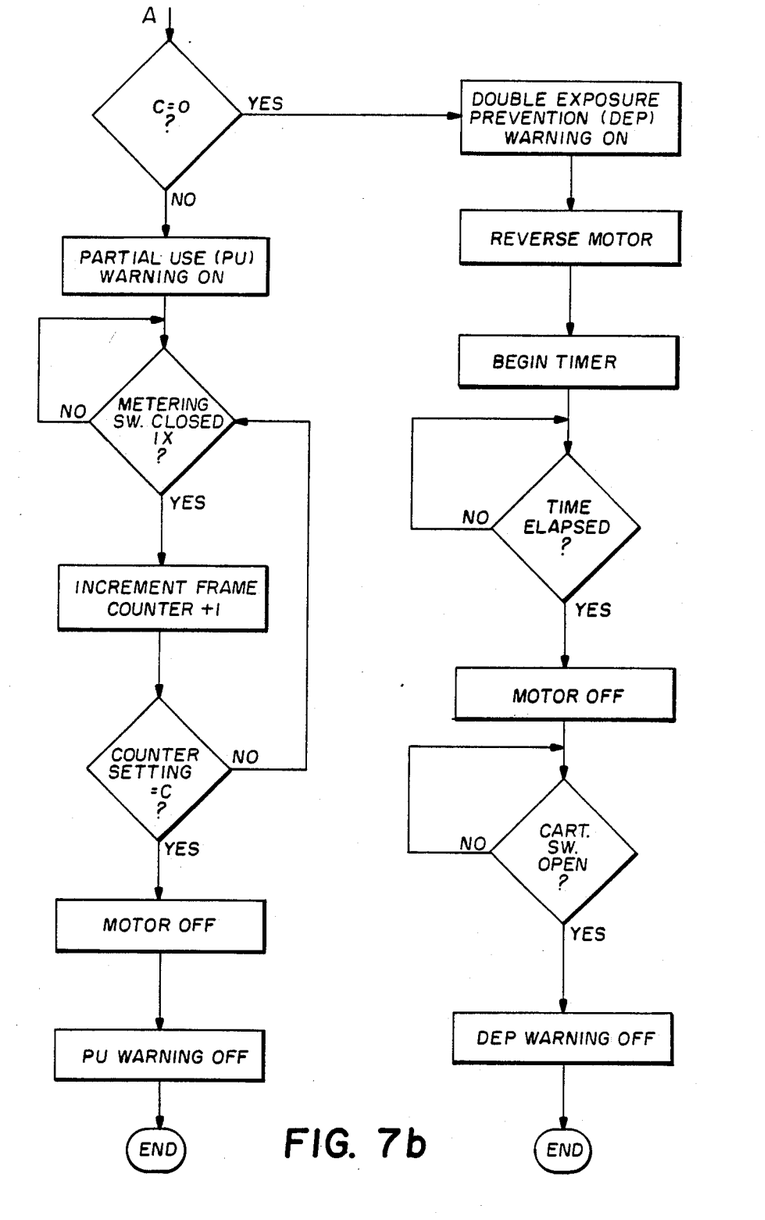
Figure 8:
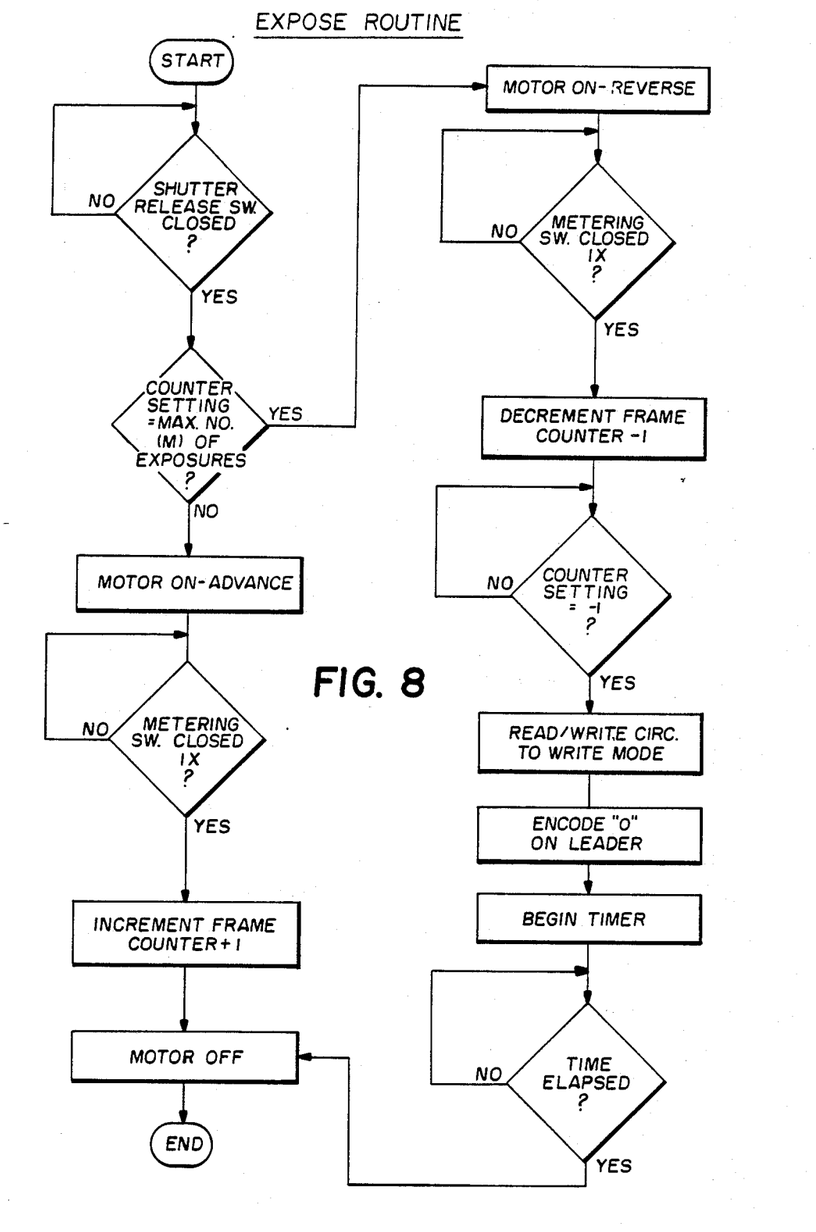
FIG. 8 is a flow chart illustrating an expose routine of the camera apparatus.

Flow Charts FIGS. 7-9

FIGS. 7a, 7b, 8, and 9a, 9b are respective flow charts which depict three explicit routines or modes of the microcomputer 153 which are effected in cooperation with the switches 133, 139, 141, 143, and 145, with the film transport means 109, with the DX sensors 131, with the read/write head 135, with the frame counter 137, and with the midroll interrupt (MRI), partial use (PU), and double-exposure prevention (DEP) warning circuits 147, 149, and 151.

(1) Load/Double Exposure Prevention (DEP) Routine - FIGS. 7a, 7b

If in this routine the door switch 139 is closed because the rear door 103 is closed, the cartridge switch 141 is closed because the film cassette 1 is present in the loading chamber 107, and the maximum number M of exposures, i.e. the total number of available film frames, using the filmstrip F, is determined by the DX sensors 131 reading a known DX encodement on the outside of the cassette shell 3, the maximum number M will be stored in the RAM 163 and the motor 113 will be energized to rotate the spool core 23 of the film cassette in the unwinding direction U, thereby propelling the film leader 43 to the outside of the cassette shell. When the metering switch 133 is closed three times to indicate that the immediate frame area preceeding the first-available frame #1 in FIG. 6 is in the exposure position at the back frame opening 125, the relatively small magnetic area 169 of the film leader 43 will be positioned in contact with the read/write head 135 and the read/write circuit 157 will be changed by the CPU 159 to a read mode.

If the read/write head 135 does not detect any frame number data (C) at the magnetic area 169 of the film leader 43, this indicates that the filmstrip F is completely unexposed, i.e. the maximum number M of film frames is available for picture-taking. Then, when the metering switch 133 is closed one more time, the frame counter 137 will be incremented by the CPU 159 to "1" and the motor 113 will be de-energized. At this time, the first-available frame #1 in FIG. 6 will be in the exposure position.

If the read/write head 135 instead does detect frame number data C at the magnetic area 169 of the film leader 43, and the data represents the particular number "0", this indicates that the filmstrip F was completely exposed before the film cassette 1 was inserted into the loading chamber 107, i.e. there are no unexposed frames available for picture-taking. As a result, the DEP warning circuit 151 will be activated to alert the user of such condition. Then, the motor 113 will be reversed to rotate the spool core 23 in the winding direction W to rewind the film leader 43 back into the cassette shell 3. At the same time, the timer 165 will be activated. When the timer 165 determines that a sufficient time, e.g. one-half second, has elapsed to rewind the film leader 43 into the cassette shell 3, the motor 113 will be de-energized. Since the DEP warning circuit 151 remains activated, the user is reminded to remove the film cassette 1 from the loading chamber 107, whereupon the circuit will be de-activated.

If the read/write head 135 detects frame number data C at the magnetic area 169 of the film leader 43, and the data represents a particular number greater than "0" but less than the maximum number M, this indicates that the filmstrip F was partially exposed before the film cassette 1 was inserted into the loading chamber 107, i.e. there is at least one unexposed frame available for picturetaking. As a result, the PU warning circuit 151 will be activated to alert the user of such condition. Then, when the metering switch 113 is closed a sufficient number of times to increment the frame counter 137 to a numbered setting equal to the particular number indicated by the frame number data C, the motor 113 will be de-energized and the PU warning circuit 151 will be de-activated. At this time, the next-available unexposed frame will be in the exposure position.

(2) Expose Routine - FIG. 8

If in this routine the shutter release switch 143 is closed because the camera shutter is opened, and the setting of the frame counter 137 is a numbered one less than the maximum number M, the motor 113 will be energized to rotate the spool core 23 in the unwinding direction U to advance the filmstrip F from the cassette shell 3. When the metering switch 133 is closed one time to indicate that the next-available unexposed frame is in the exposure position, the frame counter 137 will be incremented by "1" to a numbered setting which represents that frame. Then, the motor 113 will be de-energized.

If the setting of the frame counter 137 is a numbered one equal to the maximum number M, and the shutter release switch 143 is closed, indicating that the last-available frame was exposed, the motor 113 will be energized to rotate the spool core 23 in the winding direction W to return the filmstrip F to the cassette shell 3. When the metering switch 133 is closed a sufficient number of times to decrement the frame counter 137 to its dot "." setting immediately following its "1" setting, i.e. to a "−1" setting in the flow chart, the film leader 43 will be positioned with its magnetic area 169 in contact with the read/write head 135. Then, the read/write circuit 157 will be changed to its write mode and the read/write head 135 will write frame number data C on the leader area 169 which represents a "0", indicating that the filmstrip F is completely exposed. At the same time, the timer 165 will be activated. When the timer 165 determines that a sufficient time has elapsed to rewind the film leader 43 into the cassette shell 3, the motor 113 will be de-energized.

Figure 9A:
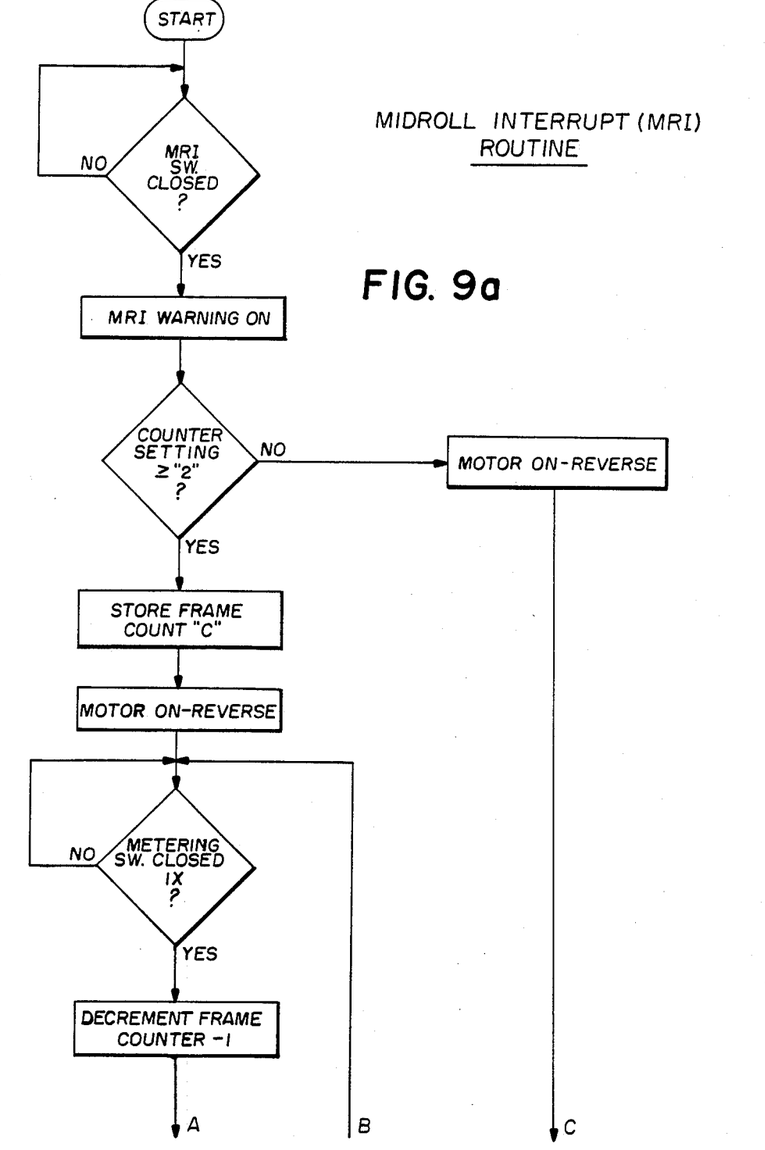
FIGS. 9a, 9b are a flow chart illustrating a midroll interrupt (MRI) routine of the camera apparatus.
Figure 9B:
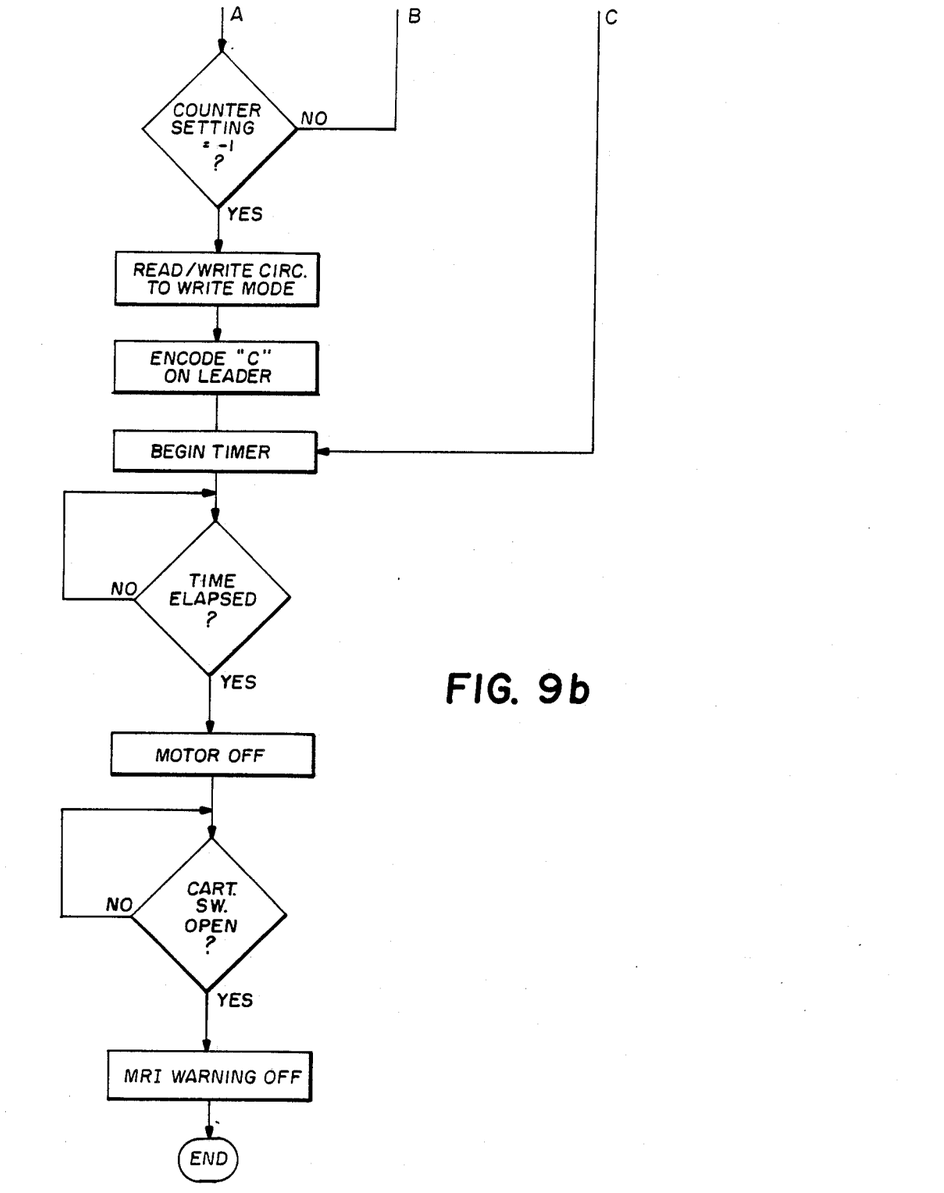

(3) Midroll Interrupt (MRI) Routine-FIGS. 9a, 9b

If in this routine the MRI switch 145 is closed because the user has manually depressed the MRI button, the MRI warning circuit 147 will be activated to alert the user of such condition. When the particular setting of the frame counter 137 is either "1" or a dot ".", this means that the first-available frame #1 in FIG. 6 has not been exposed, i.e. the filmstrip F is completely fresh. Thus, no frame count will be stored in the RAM 163 and the motor 113 will be reversed to rotate the spool core 23 in the winding direction W to rewind the film leader 43 into the cassette shell 3. At the same time, the timer 165 will be activated. When the timer 165 indicates that a sufficient time has elapsed to rewind the film leader 43 into the cassette shell 3, the motor 113 will be de-energized and the MRI warning circuit 143 will be de-activated.

When the particular setting of the frame counter 137 is between "2" and the maximum number M, to indicate that unexposed frame #2 or greater in FIG. 6 is in the exposure position, and the MRI switch 145 is closed, the frame count C at that time, will be stored in the RAM 163 as an indication of the next-available unexposed frame. Then, the motor 113 will be reversed to rotate the spool core 23 in the winding direction W to return the filmstrip F to the cassette shell 3. When the metering switch 133 is closed a sufficient number of times to decrement the frame counter 137 to its dot "." setting immediately following its "1" setting, i.e. to a "−1" setting in the flow chart, the film leader 43 will be positioned with its magnetic area 169 in contact with the read/write head 135. Then, the read/write circuit 157 will be changed to its write mode and the read/write head 135 will write frame number data C on the leader area 169 which represents the particular number of the next-available unexposed frame, indicating that the filmstrip F is only partially exposed. At the same time, the timer 165 will be activated. When the timer 165 determines that a sufficient time has elapsed to rewind the film leader 43 into the cassette shell 3, the motor 113 will be de-energized. Then, when the film cassette 1 is removed from the loading chamber 107, allowing the cartridge switch 141 to open, the MRI warning circuit 147 will be de-activated.

Operation

When the filmstrip F is completely exposed in the camera apparatus 101, double-exposure prevention (DEP) data is magnetically applied to the film leader 43 substantially immediately before the leader is rewound with the filmstrip into the film cassette 1. The DEP data indicates there are no unexposed imaging areas remaining on the filmstrip F. If the filmstrip F is rewound into the film cassette 1 prematurely, i.e. without it being completely exposed, midroll interrupt (MRI) data is magnetically applied to the film leader 43 instead of the DEP data to indicate the next-available unexposed imaging area of the filmstrip. When the film cassette 1 is re-loaded into the loading chamber 107, the film leader 43 will be advanced from the film cassette initially to determine whether the leader is encoded with DEP or MRI data. If the DEP data is detected, the film leader 43 is rewound into the film cassette 1 since all of the imaging areas of the filmstrip F are exposed. If the MRI data is detected, the filmstrip is advanced from the film cassette 1 to locate the next-available unexposed imaging area in an exposure position at the back frame opening 125. Warning means 151 or 149, responsive to the sensing of the DEP data or the MRI data, provides a visible signal that a completely used or partially used film roll has been loaded in the camera.

The invention has been described with reference to a preferred embodiment. However, it will be appreciated that variations and modifications can be affected with the ordinary skill in the art without departing from the scope of the invention. For example, the leading end 45 of the film leader 43, instead of initially being located as shown in FIG. 3, could be located in the film passage slit 25 of the film cassette 1 or could very slightly protrude from the cassette. Thus, the term "non-protruding" as it refers to the film leader 43 in this application is meant to include "essentially non-protruding".

Although the camera apparatus 101 is intended to expose a film frame and then wind it onto the take-up drum 121, the apparatus could similarly be designed to wind the exposed frame into the film cassette 1 (rather than onto the take-up drum) as suggested in commonly assigned U.S. Pat. No. 4,724,451, granted Feb. 9, 1988.

I claim:

1. An improved photographic camera to be used with a film cassette containing a filmstrip having a film leader on which various information can be magnetically written and read, wherein (a) motorized film transport means is operated to advance the filmstrip from the film cassette to locate respective unexposed imaging areas of the filmstrip in an exposure position and is operated to wind the filmstrip into the cassette to protect exposed imaging areas, and (b) midroll interrupt means can be manually activated to operate said film transport means to wind the filmstrip into the cassette prematurely before all of the imaging areas are exposed, and wherein the improvement comprises:

magnetic read/write means for magnetically writing certain data on the film leader, when the filmstrip is wound into the film cassette before all of the imaging areas are exposed, which enables the next-available unexposed imaging area to be determined, and for magnetically reading the same data on the film leader; and control means for operating said film transport means, when said read/write means reads said data which enables the next-available unexposed imaging area to be determined, to re-advance the filmstrip from the film cassette to locate said next-available unexposed imaging area in the exposure position.

2. The improvement as recited in claim 1, wherein said film transport means winds the filmstrip into the film cassette sufficiently to locate the film leader inside the cassette and re-advances the filmstrip from the cassette initially to locate only the leader outside the cassette, and wherein said read/write means writes said data which enables the next-available unexposed imaging area to be determined on the film leader substantially immediately before the leader is wound into the cassette and reads the same data substantially immediately after the leader is located outside the cassette.

3. The improvement as recited in claim 1, further comprising:
   partial use warning means for providing a discernable warning, when said read/write means reads said data which enables the next-available unexposed imaging area to be determined.

4. The improvement as recited in claim 1, wherein said data which enables the next-available unexposed imaging area to be determined is a representation of the particular number of that imaging area.

5. The improvement as recited in claim 1, wherein said read/write means writes certain data on the film leader, when all of the imaging areas of the filmstrip are exposed, which indicates the filmstrip is completely exposed and magnetically reads the same data on the film leader, and wherein said control means prevents said film transport means from being operated to re-advance the filmstrip from the film cassette to locate any of the exposed imaging areas in the exposure position, when said read/write means reads said data which indicates the filmstrip is completely exposed.

6. The improvement as recited in claim 5, further comprising:
   double exposure prevention warning means for providing a discernable warning, when said read/write means reads said data which indicates the filmstrip is completely exposed.

7. The improvement as recited in claim 5, wherein said film transport means winds the filmstrip into the film cassette sufficiently to locate the film leader inside the cassette and re-advances the filmstrip from the cassette initially to locate only the leader outside the cassette, and wherein said read/write means writes said data which enables the next-available unexposed imaging area to be determined or which indicates the filmstrip is completely exposed on the film leader substantially immediately before the leader is wound into the cassette and reads the same data substantially immediately after the leader is located outside the cassette.

8. The improvement as recited in claim 7, wherein said control means operates said film transport means to re-locate the film leader inside the film cassette substantially immediately after the leader is located outside the cassette, when said read/write means reads said data which indicates the filmstrip is completely exposed.

9. The improvement as recited in claim 5, wherein said control means operates said film transport means to advance the filmstrip from the film cassette to locate an initial one of the imaging areas in the exposure position, when said read/write means cannot read said data which enables the next-available unexposed imaging area to be determined or which indicates the filmstrip is completely exposed.

10. An improved photographic camera to be used with a film cassette having a film spool rotatable in a winding direction to wind a filmstrip, including a film leader on which alterable data can be magnetically written and read, into the cassette and rotatable in an unwinding direction to propel the filmstrip, including the film leader, from the cassette, wherein motorized film transport means is operated to rotate the film spool in the winding and unwinding directions, and wherein the improvement comprises:
   magnetic read/write means for magnetically writing alterable data on the film leader substantially immediately before the leader is wound into the cassette and for magnetically reading the same data on the leader substantially immediately after the leader is propelled from the cassette.

11. The improvement as recited in claim 10, wherein said read/write means writes alterable data on the film leader which indicates that the filmstrip is completely exposed, when all of the imaging areas of the filmstrip are exposed, and further comprises:
   control means for operating said film transport means to rotate the film spool in the winding direction, when said read/write means reads said data which indicates that the filmstrip is completely exposed, to wind the film leader into the cassette substantially before a greater extent of the filmstrip can be propelled from the cassette.

12. The improvement as recited in claim 11, wherein midroll interrupt means can be manually activated to operate said film transport means to rotate the film spool in the winding direction prematurely before all of the imaging areas of the filmstrip are exposed, and wherein said read/write means magnetically writes alterable data on the film leader which indicates the next-available unexposed imaging area of the filmstrip, when the filmstrip is wound into the cassette before all of the imaging areas are exposed, and said control means operates said film transport means to rotate the film spool in the unwinding direction, when said read/write means reads said data which indicates said next-available unexposed imaging area, to propel the filmstrip from the cassette to permit the next-available unexposed imaging area to be exposed.

* * * * *